UNITED STATES PATENT OFFICE.

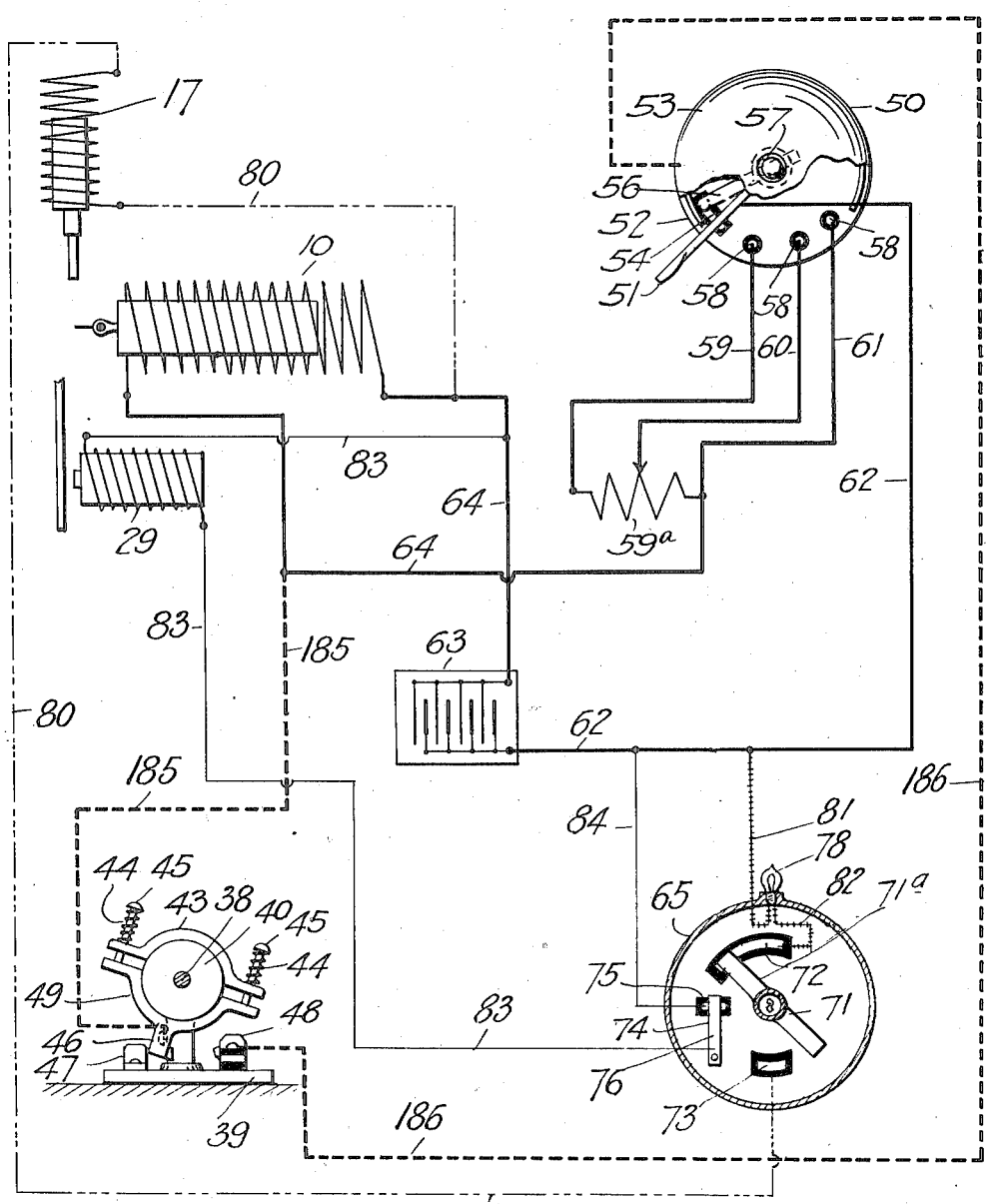

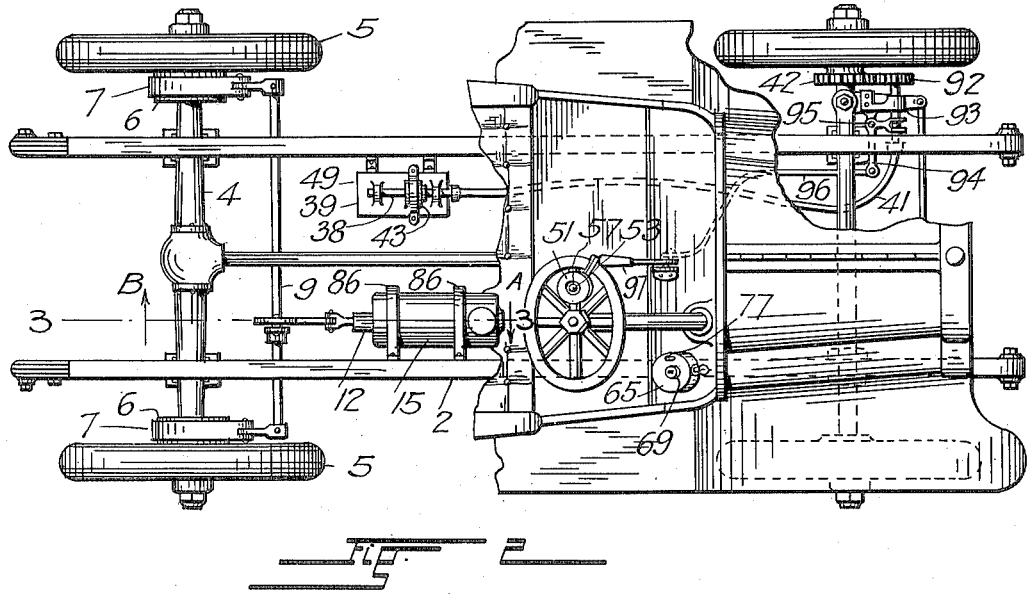
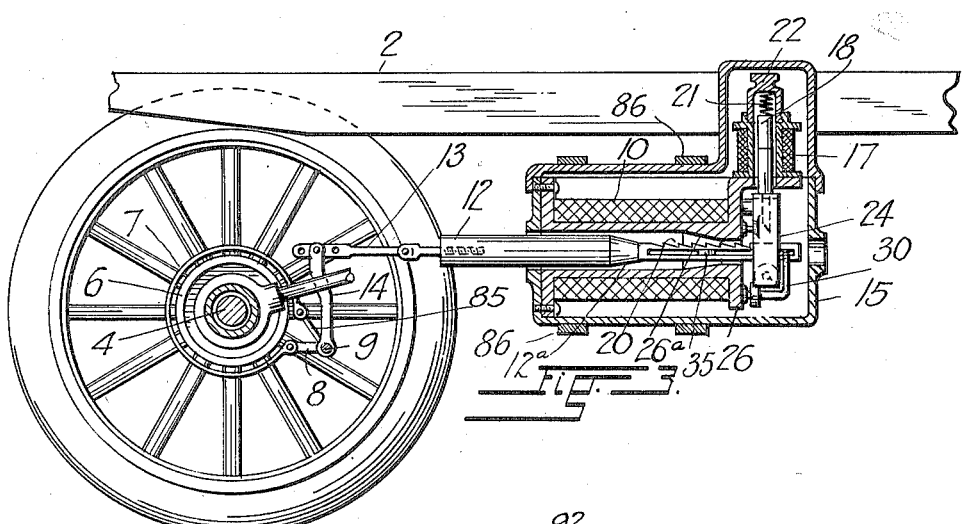

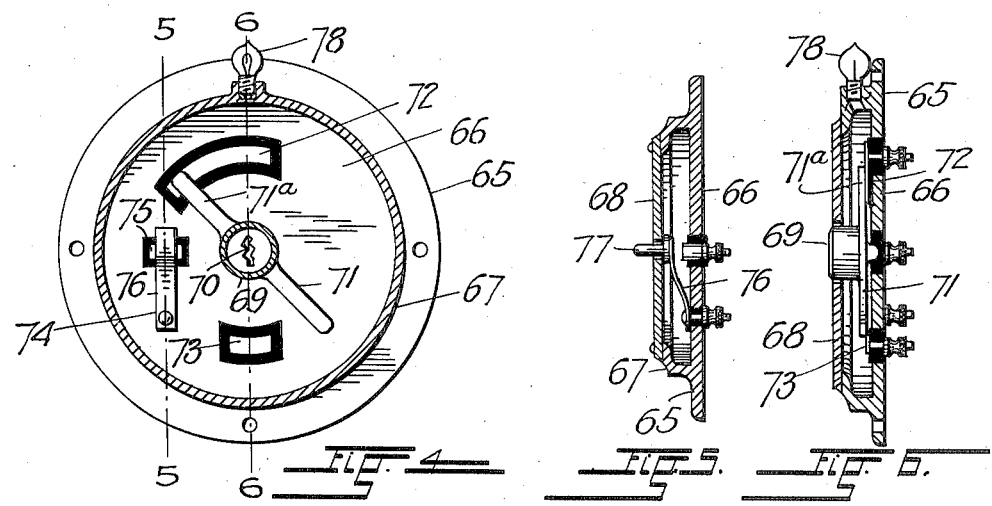
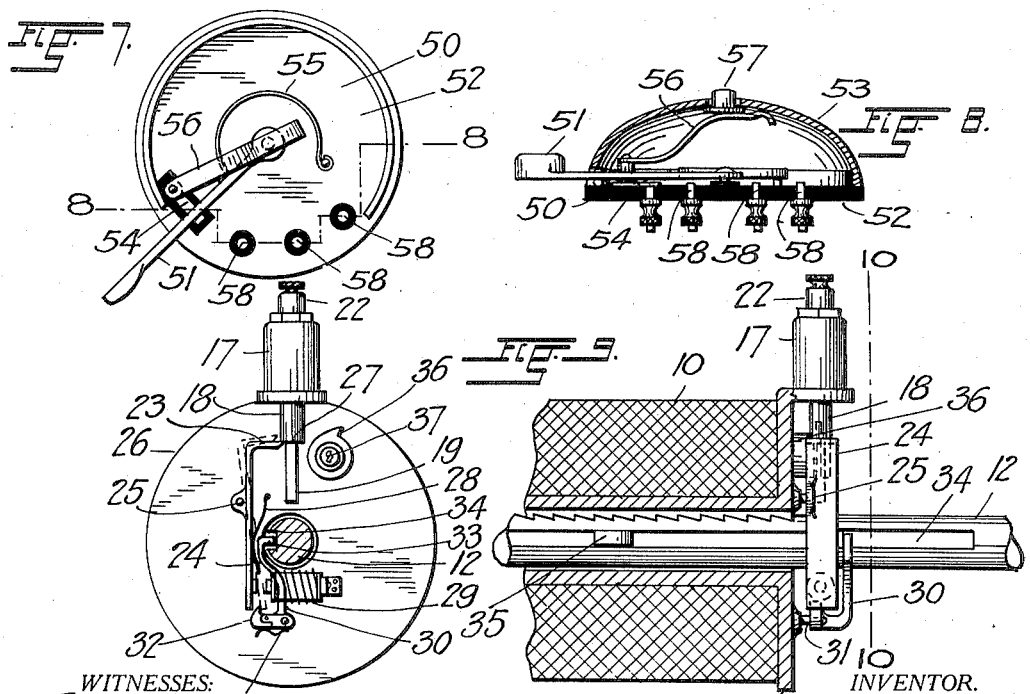

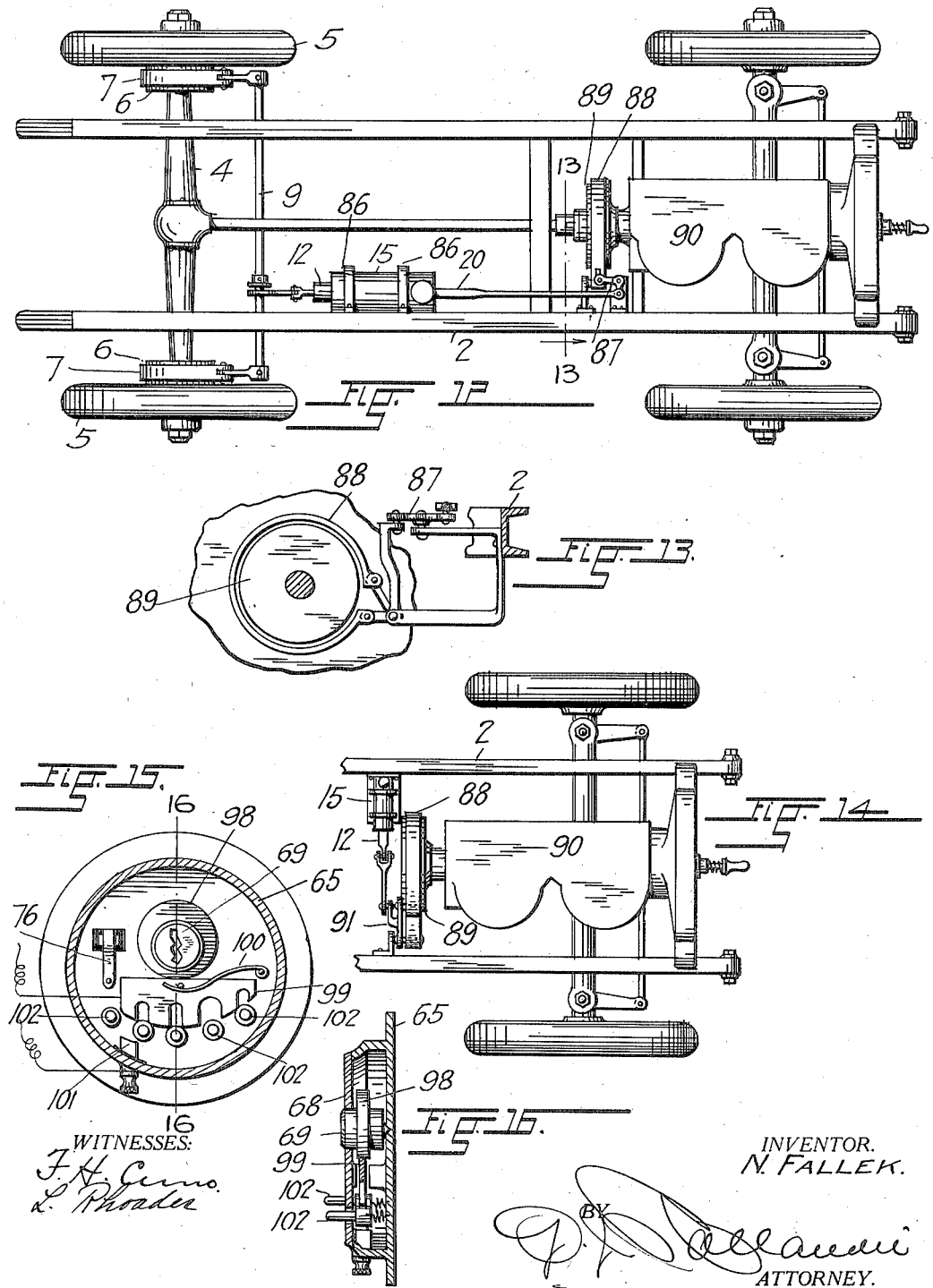

NATHAN FALLEK, OF DENVER, COLORADO.

ELECTRIC BRAKE SYSTEM.

1,295,020. Specification of Letters Patent. Patented Feb. 18, 1919.

Application filed June 30, 1915. Serial No. 37,219.

*To all whom it may concern:*

Be it known that I, NATHAN FALLEK, a citizen of the United States, residing at Denver, in the county of Denver and State of Colorado, have invented certain new and useful Improvements in Electric Brake Systems, of which the following is a specification.

This invention relates to an electric brake mechanism for vehicles, and its primary object resides in providing a system of electrically connected devices for operating the brake of a vehicle, which includes key-controlled means for locking the brakes in their active positions and means for the automatic operation of the brakes during rearward movement of the vehicle.

Another object of my invention is to provide either separate from or in coöperative association with the brakes which arrest movement of the wheels of a power driven vehicle, a brake which retards or arrests the motion of the motor of the vehicle by engagement with the fly-wheel or other rotary part of the same.

In the accompanying drawings in the various views of which like parts are similarly designated, Figure 1 is a diagrammatic representation of the electrical devices and connections included in my improved brake system, Fig. 2, a plan view of the chassis of an automobile to which the brake system is applied, Fig. 3, an enlarged section taken along the line 3—3, Fig. 2 looking in the direction of the arrow B, Fig. 4, a partially sectional face view of the circuit closing switch which controls the locking element of the invention, Fig. 5, a section taken along the line 5—5, Fig. 4, Fig. 6, a section taken along the line 6—6, Fig. 4, Fig. 7, a face view of the body portion of the switch which controls the operation of the brake actuating element of the invention, Fig. 8, a section taken along the line 8—8, Fig. 7, Fig. 9, a fragmentary axial section through the solenoid which operates the brake, taken on the plane indicated by the line 3—3, Fig. 2, looking in the direction of the arrow A.

Fig. 10, a section taken along the line 10—10, Fig. 9,

Fig. 11, a fragmentary view drawn to an enlarged scale, of the means for separating the gears which transmit the movement of a rotary part of the vehicle to the automatic switch included in the system.

Fig. 12, a plan view of the chassis of a motor-driven vehicle showing the application of my brake system to the fly wheel of the motor and to the rear axle of the vehicle.

Fig. 13, a transverse section taken along the line 13—13, Fig. 12, drawn to an enlarged scale, Fig. 14, a fragmentary plan view of the chassis of a motor driven vehicle showing the method of applying the brake system to the fly-wheel of the motor exclusively.

Fig. 15, a sectional view of a modified form of the circuit controlling element shown in Fig. 4, and Fig. 16, a section taken along the line 16—16, Fig. 15.

Referring first to Figs. 2 and 3 of the drawings, the reference numeral 2 designates the chassis of a motor driven vehicle supported upon the front and rear axles 3 and 4. Band brakes applied to the wheels 5 on the rear axle are composed of friction drums 6 partially encircled by bands 7.

The bands are at one of their ends connected with crank arms 8 on a rocker shaft 9 and their opposite ends are held in a relatively fixed position by means of links 85 which are loosely supported upon the shaft.

The rocker shaft has an upwardly extending arm 14 which by means of a pitman 13 is connected with the core 12 of a solenoid 10.

The solenoid together with a locking element hereinafter to be described are preferably inclosed in a dust-proof casing 15 which by means of straps 86 is attached to one of the side bars of the chassis.

The core 12 of the solenoid has an extension 20 of reduced diameter, and at its junction with the same it is tapered as at 12ª to provide a plug which, when the solenoid is magnetized, enters a correspondingly formed socket, 26ª. in the spool 26 of the same.

The abruptly tapering socket of the spool, and the correspondingly tapering plug on the core, produce conjointly, a magnetic attraction which aids in drawing the core to its full extent into the coil.

The locking element of the system comprises a solenoid 17 mounted upon the spool 26 of the solenoid 10 at right angles thereto, and including a core 18 which at its lower end, has a detent 19 adapted to engage with a series of ratchet teeth in the extension 20 of the core of the brake-operating solenoid.

A spring 21 disposed in a housing 22 secured upon the spool of the solenoid 17 bears upon the core of the latter to move its detent into engagement with the ratchet teeth. The core 18 is normally held in an elevated position in which its detent is separated from the teeth, upon a rest 23 formed at the end of a lever 24 which is fulcrumed as at 25 upon the end of the spool 26, and a spring 28 engaging the arm of the lever opposite to that on which the rest is formed, yieldingly maintains the latter in its normal position.

The lower arm of the lever carries the armature of an electro-magnet 29 which is mounted on the spool 26 of the solenoid 10 and which when operated serves to disengage the rest 23 from the shoulder 27 on the solenoid core 18.

When by the attractive force of the electro-magnet the lever 24 is moved about its fulcrum to disengage its rest 23 from the shoulder 27 on the core 18 it is brought in engagement with a bell crank 30 which retains it in its adjusted position after the magnet is deënergized.

The bell-crank which is best shown in Fig. 10 of the drawings, is fulcrumed as at 31 upon the end of the spool 26, and it carries at the extremity of one of its arms a spring-held catch 32 adapted to engage the lower end of the lever 24.

The opposite arm of the bell crank has at its extremity a projection 33 which extends loosely into a longitudinal groove 34 of the solenoid core 12. Within this groove is disposed a trip 35 which by engagement with the member 33 at a determinate point in the axial movement of the core, moves it out of the groove and thereby disengages the catch at the end of the bell-crank from the lever 24 which in consequence is released to return to its normal position by the action of the spring 28.

In the ordinary operation of the system the pawl 19 is lifted out of engagement with the teeth on the extension of the core 12 by energization of the solenoid 18, or in case of an emergency, as for example when the solenoid connections are broken or short circuited, the pawl may be lifted by rotation of a cam 36 which is mounted upon the end of the solenoid spool 26.

The cam lifts the pawl by engagement with the shoulder 27 on the core of which it forms part and it has a slot 37 for the insertion of a key by means of which it can be rotated from a point without the casing 15 in which the above described elements are inclosed.

In the construction shown in Figs. 12 and 13 of the drawings, the part 20 of the solenoid core 12 is extended to connect with a bell-crank 87 which by an arrangement of parts similar to those which connect the solenoid core with the band 7 of the brake drum 6 is connected with a brake band 88 which encircles the fly-wheel 89 of the engine 90. By these means brakes may be applied simultaneously to the wheels of the vehicle and to the engine of the same.

In Fig. 14 of the drawings is illustrated a method of connecting the solenoid core only with the brake band of the fly-wheel. The solenoid is in this form placed at right angles to the axis of rotation of the fly-wheel and connected with a bell-crank 91.

The element of the invention which automatically operates the brake during rearward movement of the vehicle, is of a character similar to that shown and described in my application for Patent No. 837,820, filed May 11, 1914.

It consists in its preferred form, of a circuit controlling switch 49 shown in Fig. 1 which is adapted to automatically close a circuit in which it is connected by the reverse movement of a rotary part of the vehicle with which it is either directly or indirectly connected.

In the construction shown in the drawings, the switch is composed of a shaft 38 mounted for rotation in bearings upon a base 39 and carrying a circumferentially grooved disk 40.

The shaft is connected to move in unison with the front wheel of the vehicle by means of a flexible shaft 41 which at one of its ends is attached to an end of the shaft 38, while its opposite end is driven from the wheel by means of a pair of gear wheels 42 and 92.

A ring 43 in the peripheral groove of the disk 40 is composed of two halves which are yieldingly held in frictional contact with the face of the disk by springs 44 coiled around headed bolts 45 on one of the halves which extend loosely through openings in the other half. The ring 43 has a downwardly projecting finger 46 which normally engages one of two stops 47 and 48 secured upon the base 39 to limit the movement of the ring with the disk upon which it is mounted in either direction.

The stop 48 from which the finger is normally separated has an insulated contact piece which provides one of the terminals of a break in an electric circuit the opposite terminal of which is in electric connection with the ring 43.

The shaft 41 is at its end at which it carries the gear wheel 92 slidably supported in a bearing 93 and has a pivotal connection with a bell crank 94 fulcrumed on the bearing as at 95, which by means of a rod 96 is connected with the reversing lever 97 of the engine of the power driven vehicle.

This arrangement prevents the operation of the automatic controlling switch when the driver by adjustment of the lever 97 intentionally reverses the motion of the vehicle.

The manually operated circuit-closing switches included in the brake system are designed to control respectively the circuit of the brake operating solenoid and those of the solenoid and the magnet comprised in the locking element.

In describing the construction of these switches their connection with the parts they control will be explained by reference to the diagrammatic representation shown in Fig. 1 of the drawings.

The switch 50 which controls the flow of current through the solenoid 10 for the operation of the brakes consists of a metal contact bar 51 which is pivoted upon a base 52 of nonconductive material.

The end of the bar opposite to that at which it is pivoted, projects for its manipulation through a slot formed in a metallic casing 53 which is screwed upon an exteriorly threaded rim of the base.

The bar is held normally in engagement with a contact piece 54 on the base by means of a spring 55 the said contact being electrically connected with the end of a resilient contact blade 56 which at its opposite end engages the metallic casing 53.

A button 57 of nonconductive material is disposed in an opening of the casing 53 for engagement with the blade 56 to separate its end from the casing when it is desired to break the circuit in which these conductive parts are connected.

The base 52 has furthermore, in the path of the bar 51 to be successively engaged thereby, a series of contacts 58 which in conjunction with a resistance coil 59ª provide a rheostat for regulating the strength of the current supplied to the windings of the solenoid.

The contacts are separately connected at different points in the resistance coil by means of wires 59, 60 and 61 and the bar 51 is by means of a conductor 62 connected with a pole of a source of electricity 63, preferably a battery, the other pole of which is connected with the resistance coil by means of a conductor 64 in which the windings of the solenoid 10 are included. This circuit which may be termed the main operating circuit of the system, has been designated in the drawings by heavy full lines.

The operating parts of the circuit closing mechanism of the switch 65 which controls the operation of the locking element of the system are contained within a circular rim 67 of a base 66 upon which a cover 68 is securely fastened.

Rotatably mounted in a central opening of the cover and upon a step on the base 66, is a barrel 69 which has a slot 70 for the insertion of a key.

The barrel 69 has two oppositely extending contact bars 71 and 71ª one of which is in constant engagement with a segmental contact 72 on the base 66, a second contact 73 being positioned on the base to be engaged by the other bar 71 when by means of a key inserted in its slot the barrel 69 is rotated.

The switch 65 carries a second circuit closing element 74 consisting of a contact 75 fixed on the base 66, a resilient blade 76 also secured upon the base and a push button 77 which is loosely disposed in an opening of the cover 68 to move the blade into engagement with the contact whereby to close a circuit in which these conductive parts are connected.

In addition to the circuit controlling elements hereinabove described, the switch 65 carries a small incandescent lamp 78 which is electrically connected in a circuit to be lighted when the bar 71 is moved into engagement with the contact 73.

The contact 72 of the switch 65 which is in constant engagement with the bar 71ª of the same is by means of a conductor 79 connected with the conductor 62 of the main circuit which connects with a pole of the battery 63, and a conductor 80 in which the windings of the solenoids 17 of the locking element are included, connects the other contact 73 of the switch with the conductor 64 of the main circuit which connects with the opposite pole of the source.

The lamp 78 is connected in a shunt circuit which includes a wire 81 connecting a terminal of the lamp with the conductor 62 of the main circuit, and a wire 82 which connects the other terminal of the lamp with the contact 72.

The contact 75 and the resilient blade 76 of the other circuit controlling element 74 are connected at opposite sides of a break in an electric circuit in which the windings of the electro-magnet 29 are included and which consists of a wire 83 connecting the blade 76 with a pole of the battery 63 through the medium of the conductor 64 of the main circuit and which includes the magnet coil 29, and a wire 84 which by means of the conductor 62 of the main circuit, connects the contact 75 with the opposite pole of the battery.

The circuit of the solenoid 17 has been differentiated from the other circuits in the drawing by dash-dot lines, the lamp circuit has been shown in scored lines, and the circuit of the magnet 29 has been drawn in light unbroken lines.

A modification of the switch 65 has been shown in Figs. 15 and 16 of the drawings.

The barrel 69 is provided with an eccentric 98 which bears upon the upper edge of a metal slide 99 which is yieldingly supported upon a spring 100. The slide is connected in one side of the circuit controlled by the switch and closes the circuit when moved by rotation of the barrel into engagement with a fixed contact 101 connected in the opposite side of the circuit.

The slide has in its lower edge a number of slots the open ends of which register with spring-held push buttons 102 which are mounted in openings in the cover 68. The buttons have two axially alined parts of different diameters the larger ones of which extend normally in the path of the slide.

Some of the slots are of sufficient width to admit the larger parts of the buttons during downward movement of the slide while other slots are only sufficiently wide to admit the smaller parts of the same.

The buttons registering with the last mentioned slots thus obstruct the downward movement of the slide and thereby prevent the operation of the switch by rotation of the barrel unless a person familiar with the combination pushes the obstructing buttons simultaneously and thereby releases the slide.

While the buttons included in the combination are pushed inwardly the slide is moved downwardly to engage the contact 101 by rotating the barrel by means of a key inserted in its slot.

The principal object of the above described modification of the switch 65 is to prevent a person who accidentally or by theft has obtained possession of the key, from operating the switch.

The connections of the automatic switch 49 in the system which have been shown in heavy broken lines, consist of a conductor 185 which connects the ring 43 with the conductor 64 of the main circuit in which the windings of the solenoid 10 are included, and a conductor 186 which connects the insulated contact 48 with the metallic casing 53 of the switch 50.

In the operation of my improved system, the brake is ordinarily operated to reduce the speed of the vehicle by moving the bar 51 from its position on the base 54, to successively engage the contacts 58, thereby closing a circuit which commencing at the source 63, includes the conductor 62, the contact parts of the switch, one of the conductors 59, 60 or 61, the resistance coil 59 and the conductor 64, in which the windings of the solenoid 10 are included and which connects with the opposite pole of the source.

The energization of the solenoid coil 10 effects the longitudinal movement of its core which through the intermediary of the pitman 13 and the rocking crank shaft 9, is translated into a tightening movement of the bands 7 around the respective brake drums 6.

The tightening effect of the solenoid upon the brake band is as mentioned hereinbefore, augmented by the magnetic attraction between the tapering socket of the solenoid-spool and the correspondingly tapering plug of the inwardly moving solenoid-core.

When the driver intends to stop the vehicle for any length of time, he first of all before reaching his destination, places the locking element in a condition in which it is ready to automatically lock the brake in its active condition.

This object is accomplished by pushing the button 77 of the circuit closing element 74 which completes the magnet circuit as follows:

Commencing at the source 63, the conductor 62 of the main circuit, the conductor 84, the parts 75 and 76 of the circuit closing element, the conductor 83 in which the windings of the magnet 29 are connected and the conductor 64 of the main circuit which connects with the opposite pole of the source.

The energization of the magnet attracts the armature to its coil thereby disengaging the rest 23 at the end of the lever 24 of which the armature forms part, from the shoulder 27 on the core 18 of the solenoid 17 and permitting the said core to engage the extension 20 of the core 12 of the solenoid 10 by the action of the spring 21.

When by the attractive force of the magnet the lever 24 is moved about its fulcrum to disengage its rest from the shoulder on the core 18, its opposite end after having passed the yielding catch 32 on the bell crank 30 is engaged thereby with the result that the lever is locked in its adjusted position independent of the subsequent condition of the magnet which is demagnetized the moment the push button 77 is released from pressure.

Now when upon reaching his destination, the driver of the vehicle applies the brake by energization of the solenoid 10 through the medium of the switch 50, the solenoid core 12 moving longitudinally, brings the ratchet teeth on its extension in engagement with the pawl 19 and is thereby locked to remain in its adjusted position after the solenoid circuit is reopened, it being observed that when the bar 51 of the switch 50 is released, it is immediately returned to its original position by action of the spring 55.

When the solenoid core 12 nears the ends of its operative movement the trip 35 is brought in engagement with the projection 33 on the bell crank 30, with the result that the catch 32 at the opposite end of the bell crank, is compelled to release the end of the lever 24 leaving the latter free to be returned to its original position in engagement with the shoulder on the core 18 by action of its spring 28, when by energization of the solenoid 17, the core 18 is moved upwardly to disengage its detent from the teeth on the extension 20 of the core 12.

The brakes being thus locked in their active condition, can be released only by the use of a key fitting the slot 70 in the rotary barrel 69 of the switch 65.

By rotation of the barrel by means of the proper key, the end of the bar 71 is brought in engagement with the contact 73 thereby closing the solenoid circuit as follows: Commencing at the source, the conductor 62 of the main circuit, the conductor 79 of the solenoid circuit, the conductive parts of the switch 65, the conductor 80 in which the solenoid windings are connected, and the conductor 64 of the main circuit which connects with the opposite pole of the source.

Prior to effecting the energization of the solenoid as hereinbefore described, the driver releases the pawl 19 from the pressure exerted thereon by the teeth on the core extension 20 by energizing the solenoid 10 and while the solenoid is in this condition, he closes the circuit of the solenoid 17 by rotating the barrel of the switch 65 by means of the key.

The energization of the solenoid 17 draws its core inwardly against the action of the spring 21 until its shoulder is engaged by the rest 23 on the spring-pressed lever 24 which when the solenoid circuit is subsequently opened, maintains it in its raised position.

When the bar 71 engages the contact 73 and thereby closes the solenoid circuit, the electric lamp 78 is lighted by a flow of current along a course which commencing at the source of electricity, includes the conductor 62 of the main circuit, the conductor 79, the contact 72, the conductor 81, the lamp filament, the conductor 82, the parts 72, 71ª, 71 and 73 of the switch, the conductor 80 and the conductor 64 of the main circuit which connects with the opposite pole of the source.

The lamp thus reminds the driver of the vehicle to remove the key from the lock which can be accomplished only after the rotary parts of the switch are returned to their original position and the solenoid circuit is consequently opened.

During forward movement of the vehicle, the finger 46 on the ring 43 of the automatic switch 49 is held in engagement with the stop 47 and the circuit in which the switch is connected is in consequence in an open condition. In case, however, the movement of the vehicle is unintentionally reversed as for instance in ascending steep inclines, the reversed motion of the wheel with which the switch shaft 38 is operatively connected, causes the disk 40 to carry the ring by frictional contact to the position in which it engages the stop 48, thereby closing the circuit controlled by the switch, as follows:

Commencing at the source, the conductor 64 of the main circuit including the windings of the solenoid 10, the conductor 185, the contact members of the switch 49, the conductor 186, the metal cover 53 of the switch 50, the blade 56 of the same, the switch bar 51, and the conductor 62 which connects with the opposite pole of the source.

The consequent energization of the solenoid 10 sets the brake and the movement of the vehicle is thus automatically arrested.

To release the brake prior to moving the vehicle forwardly after its brake has been set through instrumentality of the automatic switch, the driver of the vehicle opens the automatic switch circuit by pressing the button 57 of the switch 50 which disengages the blade 56 from the conductive casing 53, and when the driver reverses the engine for the purpose of moving the vehicle rearwardly, the connection of the reversing lever with the shaft 41 discontinues the transmission of motion from the vehicle shaft to the automatic switch and thereby renders the latter temporarily inactive.

It will be seen from the foregoing description that the electric brake system provides for every contingency in the operation of a motor driven vehicle.

The moment the driver wishes to stop the vehicle he places the locking element in readiness for automatic action by pressing the button 77; when reaching his destination he applies the brake by manipulation of the bar 51 of the switch 50 and at the same time locks them in their active condition thereby insuring against the removal of the vehicle by unauthorized persons. The brakes can subsequently be released only by use of a key fitting the slot 70 in the barrel 69 of the switch 65, or by means of a key fitting the slot 37 of the cam 36 which however, is employed only when by an inoperative condition of its circuit, the solenoid 17 cannot be energized by the operation of the switch 65.

The electric lamp 78 serves to remind the driver to remove the key from the switch 65 by returning the bar of the same to its normal position, and the automatic switch 49 prevents accidents frequently occurring by reason of uncontrolled rearward movement of the vehicle while climbing steeply inclined roads.

Having thus described my invention what I claim and desire to secure by Letters-Patent is:

1. In an electric brake system, the combination with an electrically operating brake, of a device adapted to automatically lock the brake in its active condition, electro-magnetic means in a switch controlled circuit for placing said device in a condition for automatic action, and electro-magnetic means in a switch controlled circuit for releasing the brake by actuation of said device.

2. In an electric-brake system, the combination with a brake of a vehicle, of an electric appliance in operative connection therewith, a device for locking the brake in its active condition, electro-magnetic means in a switch-controlled circuit for releasing the brake by actuation of said device, an automatic switch in circuit with said appliance and connected with a rotary part of the vehicle to be moved to a circuit-closing position by a reverse movement of said part, and a switch in the circuit of the automatic switch for deënergizing the appliance when the automatic switch is in its closed position.

3. In an electric brake system, the combination with a brake of a vehicle, of an electric appliance in operative connection therewith, a device adapted to automatically lock the brake in its active condition, electro-magnetic means in a switch-controlled circuit for placing said device in a condition for automatic action, electro-magnetic means in a switch-controlled circuit for releasing the brake by actuation of said device, an automatic switch in circuit with said appliance and connected with a rotary part of the vehicle to be moved to a circuit-closing position by a reverse movement of said part, and a switch in the circuit of the automatic switch for deënergizing the appliance when the automatic switch is in its closed position.

4. In an electric brake system, the combination with an electrically operating brake, of a device for locking the brake in its active condition, electro-magnetic means for releasing the brake by actuation of said device, a key-controlled switch in circuit with said means, and key-operated mechanical means for releasing the brake by actuation of said device.

5. In an electric brake system, the combination with a brake, of an electro-magnetic appliance operatively connected therewith and including a toothed operating-member, and an element for locking the brake in its active condition, including a pawl adapted to automatically engage a tooth on said member, a device normally holding said pawl in an inoperative position, electro-magnetic means in a switch-controlled circuit for actuating said device to release the pawl, and electro-magnetic means in a switch-controlled circuit for subsequently separating the pawl from the said member.

6. In an electric-brake system, the combination with a brake, of an electro-magnetic appliance operatively connected therewith and including a toothed operating-member, and an element for locking the brake in its active condition including a solenoid the core of which has a pawl for engagement with a tooth on said member, a switch in circuit with said solenoid, an electro-magnet the armature of which normally holds the pawl in a position in which it is separated from the member and releases it for automatic action when the magnet is energized, and a switch in circuit with the magnet.

7. In an electric brake-system, the combination with a brake, of an electro-magnetic appliance operatively connected therewith and including a toothed operating-member, and an element for locking the brake in its active condition including a solenoid the core of which has a pawl for engagement with a tooth on said member, a switch in circuit with said solenoid, an electro-magnet the armature of which normally holds the pawl in a position in which it is separated from the member and releases it for automatic action when the magnet is energized, a switch in circuit with the magnet, and a catch for holding the armature of the magnet in its attracted position after the magnet is subsequently deënergized, said catch being coöperative with the said member for releasing the armature at a determinate point in the movement of the member.

8. In an electric brake-system, the combination with a brake of a motor-driven vehicle, of an electro-magnetic appliance in operative connection with said brake, a switch in circuit with said appliance, an automatic switch in circuit with said appliance and connected with a rotary part of the vehicle to be moved to a circuit-closing position by a reverse movement of said part, and means for discontinuing the operative connection between the automatic switch and the said rotary part, in coöperative connection with the reverse-mechanism of the vehicle motor.

9. In an electric brake-system, the combination with a brake of a motor-driven vehicle, of an electro-magnetic appliance in operative connection with said brake, a switch in circuit with said appliance, an automatic switch in circuit with said appliance, gears connecting the automatic switch with a rotary part of the vehicle, and means coöperatively connected with the reverse mechanism of the vehicle-motor for disengaging said gears.

10. In a motor-driven vehicle, a brake applied to a rotary part of the vehicle, a brake applied to a rotary part of the vehicle-motor, and electric means for the actuation of said brakes.

11. In a motor-driven vehicle, a brake applied to a rotary part of the vehicle, a brake applied to a rotary part of the vehicle-motor, and electric means for the simultaneous actuation of said brakes.

12. In a motor driven vehicle, a brake applied to a rotary part of the vehicle, a brake applied to a rotary part of the vehicle-motor, and a solenoid the core of which is operatively connected with said brakes.

13. In an electric brake system, the combination with a brake, of an electro-magnet for setting the same, including a toothed armature, a releasing solenoid including a core, adapted to fall into engagement with the teeth of the first armature, for locking the brake in its active condition, and to release the same when its solenoid is energized, and a cam engaging a shoulder on the core to mechanically lift it from engagement with the teeth of the first armature.

14. In an electric brake system, the combination with a brake, of an electro-magnet for setting the same, incluing a toothed armature, and a releasing solenoid including a core, adapted to fall by gravity into engagement with the teeth of the first armature for locking the brake in its active condition, and to release the same when the solenoid is energized.

In testimony whereof I have affixed my signature in presence of two witnesses.

NATHAN FALLEK.

Witnesses:
G. J. ROLLANDET,
L. RHOADES.